(12) United States Patent
Rupp

(10) Patent No.: US 7,401,804 B1
(45) Date of Patent: Jul. 22, 2008

(54) PORTABLE TRANSPORTATION ASSEMBLY

(76) Inventor: Ronald L. Rupp, 2223-9 US-20, Fayette, OH (US) 43521

( * ) Notice: Subject to any disclaimer, the term of this patent is extended or adjusted under 35 U.S.C. 154(b) by 293 days.

(21) Appl. No.: 11/123,391

(22) Filed: May 6, 2005

Related U.S. Application Data (63) Continuation-in-part of application No. 10/873,799, filed on Jun. 22, 2004, now Pat. No. 7,163,212.

(51) Int. Cl.
*B62B 1/12* (2006.01)
(52) U.S. Cl. ...................... 280/656; 280/43.1
(58) Field of Classification Search ............... 280/43, 280/43.1, 43.11, 43.12, 43.17, 79.11, 79.2, 280/656
See application file for complete search history.

(56) References Cited

U.S. PATENT DOCUMENTS

| | | | | |
|---|---|---|---|---|
| 3,768,677 A * | 10/1973 | Moss | .......................... | 414/476 |
| 3,817,546 A * | 6/1974 | Sugiura | .................... | 280/43.12 |
| 4,003,583 A * | 1/1977 | Stanzel | .................... | 280/43.22 |
| 5,232,232 A * | 8/1993 | Kishi | .......................... | 280/43.1 |
| 5,403,024 A * | 4/1995 | Frketic | .................... | 280/43.12 |
| 5,474,320 A * | 12/1995 | Bojarski et al. | .......... | 280/5.521 |
| 5,474,416 A * | 12/1995 | Rogge et al. | ................. | 414/482 |
| 6,273,435 B1 * | 8/2001 | Stringer | .................... | 280/6.151 |
| 6,378,893 B1 * | 4/2002 | Jager | ........................... | 280/656 |
| 6,540,241 B2 * | 4/2003 | Lee | ......................... | 280/43.12 |
| 6,557,882 B2 * | 5/2003 | Harrington | ................ | 280/415.1 |
| 6,923,452 B1 * | 8/2005 | Zachmeier et al. | ........ | 280/6.151 |
| 6,945,744 B1 * | 9/2005 | Swanson | ..................... | 414/482 |
| 7,052,033 B2 * | 5/2006 | McDonell | .................... | 280/656 |
| 7,059,626 B2 * | 6/2006 | Koch | .......................... | 280/656 |
| 7,188,857 B2 * | 3/2007 | Richard et al. | .............. | 280/482 |
| 2005/0184485 A1 * | 8/2005 | Timmermans | .............. | 280/656 |
| 2007/0045993 A1 * | 3/2007 | Jager | ........................... | 280/656 |

* cited by examiner

*Primary Examiner*—Jeffrey J Restifo
(74) *Attorney, Agent, or Firm*—Law Offices of John Chupa & Associates, P.C (57) ABSTRACT

A portable transportation assembly 10 having a pair of wheels 40, 42 which may be selectively raised and lowered and which is adapted to transport a bathroom assembly 200 in an easy and efficient manner. The assembly 10 includes a selectively movable assembly 202 which allows an item 200 to be easily placed within and removed from the assembly 10, and a selectively movable back bumper assembly 202.

5 Claims, 8 Drawing Sheets

PORTABLE TRANSPORTATION ASSEMBLY

This application is a continuation-in-part of application(s) nonprovisional application Ser. No. 10/873,799 filed on Jun. 22, 2004 now U.S. Pat. No. 7,163,212

FIELD OF THE INVENTION

The present invention generally relates to a portable transportation assembly and, more particularly, to a portable transportation assembly which is adapted to selectively receive and transport a portable bathroom or other type of article or assembly and which is further adapted to be easily and selectively stored when not in use.

BACKGROUND OF THE INVENTION

A portable bathroom is used in many environments, such as upon a golf course or other generally outdoor location which has limited or no bathroom facilities. One difficulty in the use of such portable bathrooms lies in the transport of such assemblies to these localities. That is, access to these locations is often very difficult to obtain, and transportation of these relatively large and bulky portable bathroom assemblies generally requires a relatively large vehicle which has difficulty in accessing and/or easily maneuvering around/within the required location or which undesirably damages the ground or other aspects of these locations (e.g., a farm field having no road or a remote golf course location). Such damage is particularly troublesome within golf courses or other areas in which it is important to keep it "pristine".

There is therefore a need for a new and improved assembly which allows a portable bathroom to be easily and efficiently transported to a desired location and which may be later stored when not in use. The present invention provides such an assembly and may be thought of as "portable" since it has wheels which selectively retract for easy storage and since it may be quickly and easily transported to a desired location by a conventional and relatively small motorized vehicle.

SUMMARY OF THE INVENTION

It is a first non-limiting object of the present invention to provide a portable transportation assembly which overcomes the various drawbacks associated with prior transportation assemblies.

It is a second non-limiting object of the present invention to provide a portable transportation assembly which overcomes the various drawbacks associated with prior transportation assemblies and which efficiently and easily allows a portable bathroom assembly to be transported and placed in a desired location.

It is a third non-limiting object of the present invention to provide a portable transportation assembly which overcomes the various drawbacks associated with prior transportation assemblies, which efficiently and easily allows a portable bathroom assembly to be transported and placed in a desired location, and which may be easily stored when not in use.

According to a first non-limiting aspect of the present invention, a portable transportation assembly is provided. Particularly, the portable transportation assembly includes an assembly having a frame; a pair wheels; a pair of dissimilar axles which are attached to the frame in a spatially offset manner; a pair of members which are each connected to the pair of dissimilar axles and which are further connected to the pair of wheels; and an assembly which is coupled to one of the pair of dissimilar axles and which selectively rotates the one of said pair of dissimilar axles from a first position to a second position, effective to moves the pair of wheels from a first operative and low position to a second raised and storage position, and wherein the assembly includes a selectively movable back bumper assembly and wherein said selectively movable back bumper assembly includes an L-shaped bracket member which is coupled to said frame and which includes an aperture, a pair of substantially identical hinges, which are coupled to said frame, and a back member which includes an axle which is coupled to said substantially identical hinges and which is selectively movable from a first open position to a second closed position.

According to a second non-limiting aspect of the present invention, a portable transportation assembly is provided. Particularly, the portable transportation assembly includes a frame which forms a bed and which has a longitudinal axis of symmetry; a first axle which is operatively disposed through the bed portion and perpendicular to the longitudinal axis of symmetry; a tug portion; a second axle which is operatively disposed through the bed portion and perpendicular to the longitudinal axis of symmetry, the second axle being disposed below the first axle and in front of the first axle toward the tug portion; a pair of wing portions, each of the pair of wing portions receiving the first and the second axles and each of the pair of wing portions being pivotally coupled to the frame; a pair of wheels which are each respectively coupled to a unique and opposed end of the first axle and the second axle; and an assembly which is coupled to the tug portion and to the pair of wing portions and which causes the pair of wing portions to selectively rotate in order to cause the pair of wheels to selectively rotate from a first position below the frame to a second storage position above the frame, and wherein the assembly includes a selectively movable back bumper assembly.

According to a third non-limiting aspect of the present invention, a portable transportation assembly is provided. Particularly, the portable transportation assembly includes a generally rectangular frame; a first axle which is operatively disposed through the frame and which cooperates with the frame to form substantially identical first and second support regions; a first support member which is coupled to a first portion of the frame below the first axle; a second support member which is substantially identical to the first support member and which is coupled to a second portion of the frame and below the first axle; a second axle which traverses only through one of the first and second support regions and which is operatively received within the first and second support members, the second axle being disposed below the first axle; a first wing portion which is coupled to the first and to the second axle; a second wing portion which is coupled to the first and to the second axle; and a movement assembly which is coupled to the second axle and which selectively moves the second axle from a first position to a second position; and a pair of wheels which are coupled to the second axle, wherein the assembly includes a selectively movable back bumper assembly.

These and other features, aspects, and advantages of the present invention will become apparent from a reading of the following detailed description of the preferred embodiment of the invention and by reference to the following drawings.

DETAILED DESCRIPTION OF THE PREFERRED EMBODIMENT OF THE INVENTION

Figure 1:
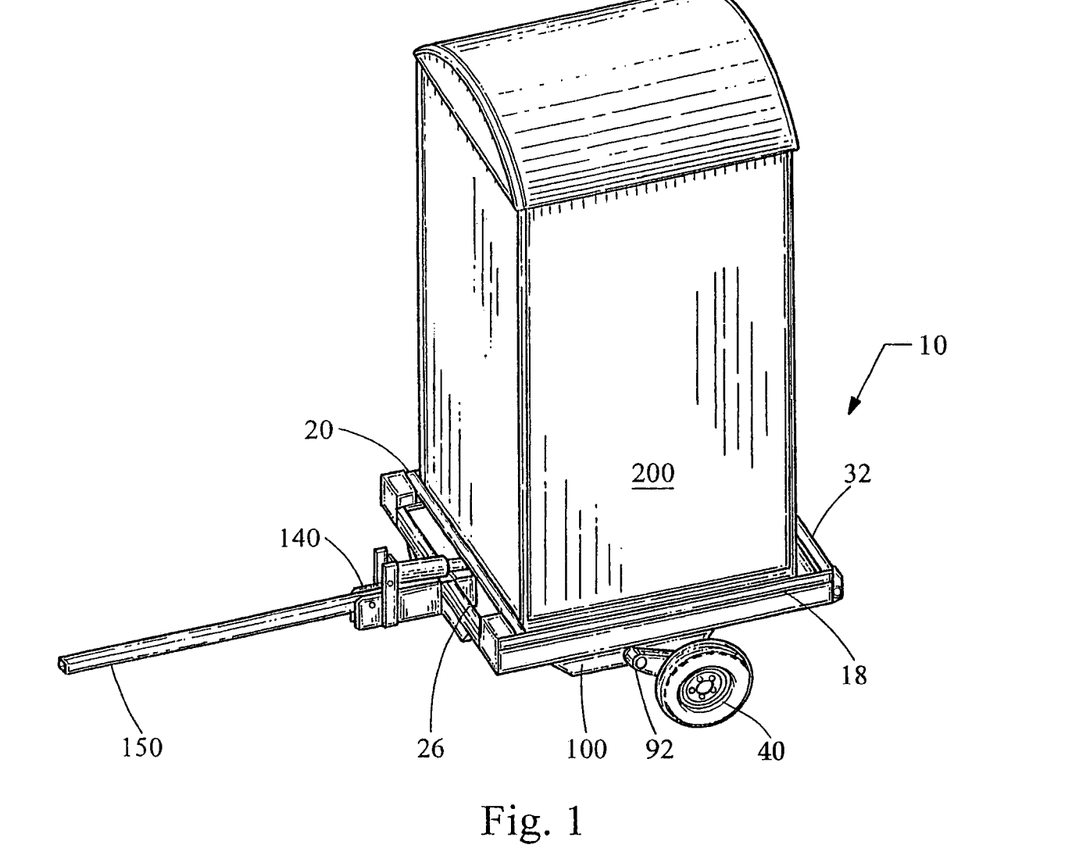
FIG. 1 is a perspective view of a portable transportation assembly which is made in accordance with the teachings of the preferred embodiment of the invention and which is shown as transporting a portable bathroom.
Figure 2:
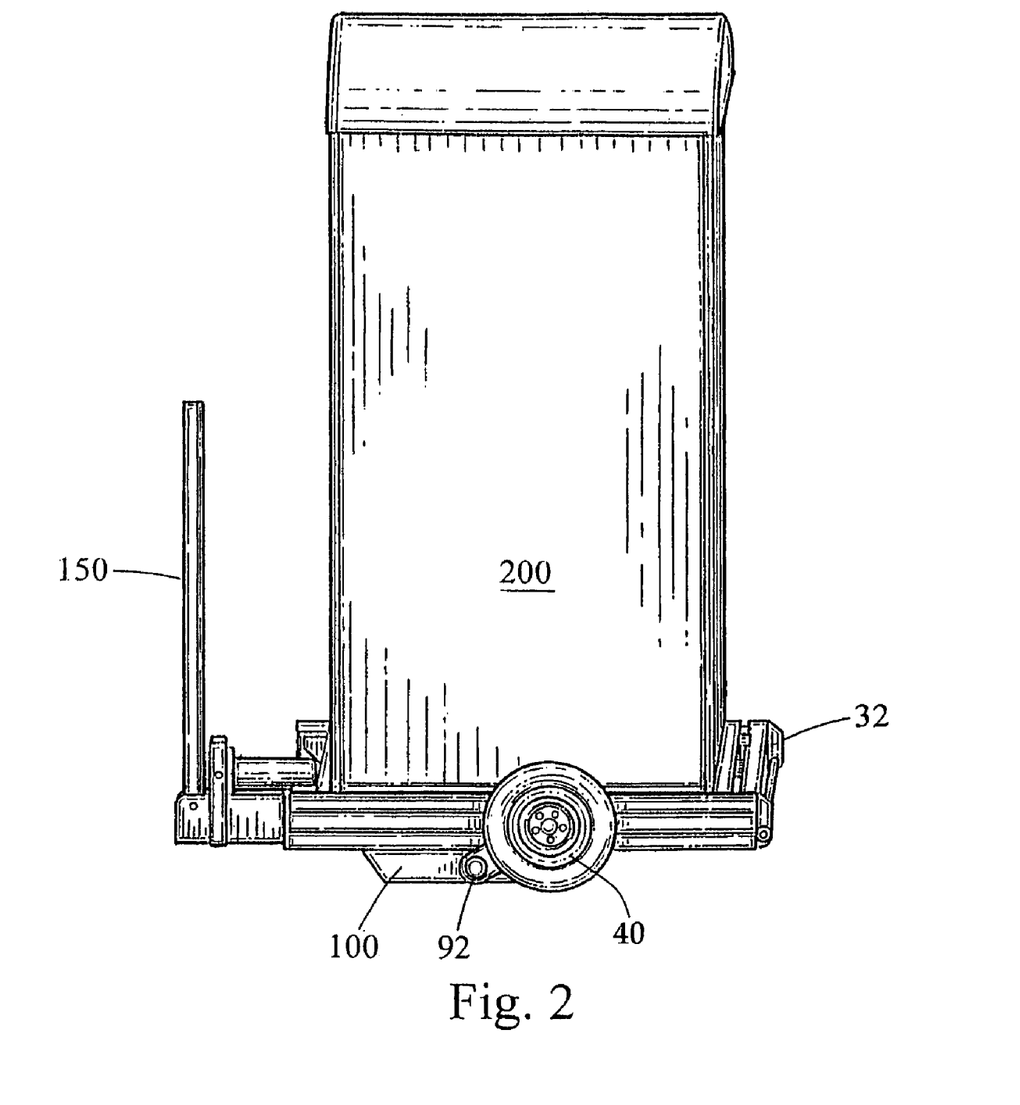
FIG. 2 is a side view of the portable transportation assembly which is shown in FIG. 1.
Figure 3:
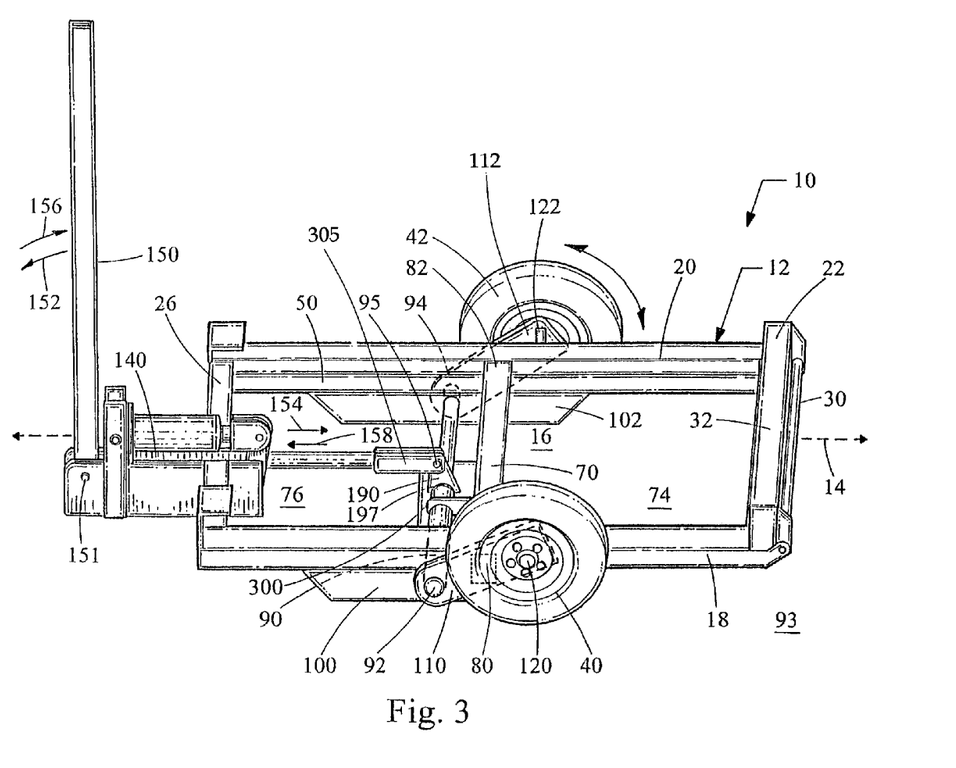
FIG. 3 is a perspective view of a portable transportation assembly which is made in accordance with the teachings of the preferred embodiment of the invention and whose wheels are shown as being selectively moved from a first operative position to a second storage position.

Referring now to FIGS. 1-3, there is shown a portable transportation assembly 10 which is made in accordance with the teachings of the preferred embodiment of the invention.

Particularly, the portable transportation assembly 10 includes a generally rectangular frame or bed portion 12 having, in one non-limiting embodiment of the invention, a longitudinal axis of symmetry 14 and forming a storage bed or storage/transportation/receiving/containment portion 16 and a pair of substantially identical wheels (e.g., wheel and tire assemblies) 40, 42.

By way of example and without limitation, the frame portion 12 is cooperatively formed by first and second substantially identical side members 18, 20. In one non-limiting embodiment of the invention, each of the substantially identical side members 18, 20 forms a ledge 50 which is longitudinally coextensive to the formed reception and support/containment/reception area 16. Further, as shown, the frame portion 12 includes a bumper or rear member 22 which is coupled to the members 18, 20 (or which may alternatively be integrally formed with the members 18, 20) and a front member 26 which is similarly coupled to (or which may be alternatively integrally formed with) the members 18, 20 and which is distally positioned from the member 22 (e.g., members 22 and 26 are respectively coupled at opposed ends of the members 18, 20 in order to form the desired containment/reception/storage portion 16). The members 22, 26, in one non-limiting embodiment of the invention, are substantially identical and have a generally rectangular cross sectional area. In another non-limiting embodiment of the invention, the bumper or end member 22 is formed from a first generally round member 30 and a second generally rectangular member 32 which "rises" or is positioned a longer distance above the formed portion 16 than does member 26 (e.g., the term "above", in the foregoing context, means in a direction away from the ground 93 upon which the wheels 40, 42 traverse).

The portable transportation assembly 10 includes a first axle member 70 which is operatively disposed within the containment/reception portion 16 and, more particularly, which lies orthogonal to the longitudinal axis of symmetry 14 and which cooperates with the frame assembly 12 to form a first and second substantially identical containment/reception/containment regions or portions 74, 76. The first axle member 70 has opposed ends 80, 82 which are respectively received by and which extend through members 18, 20. The portable transportation assembly 10 further includes a second axle 90 which, in one non-limiting embodiment of the invention, has a dissimilar shape and size than the first axle 70 (i.e., may be thinner than the first axle 70), and which has ends 92, 94 and which is operatively disposed below (e.g., is spatially offset from) the first axle 70. In the foregoing context, the term "below" means that the second axle 92 is positioned closer to the ground 93 upon which the portable transportation assembly 10 traverses than is the first axle 70.

Further, the portable transportation assembly 10 includes substantially similar members 100, 102 which are respectively coupled to members 18, 20 (or which may be alternatively integrally formed with the members 18, 20) and which respectively receive the ends 92, 94, and these ends 92, 94 respectively penetrate the members 100,102. It should be apparent to those of ordinary skill in the art that that the members 100, 102 add strength and support to the overall frame assembly 12, especially in the vicinity of the axle 90. The portable transportation assembly further includes a pair of substantially identical wing members 110, 112 and, more particularly, the member 110 receives the ends 80, 92 and an axle 120 which is coupled to the wheel 40. The member 112 receives the ends 94 and 82, as well as an axle 122 which is coupled to the wheel 42. In one non-limiting embodiment of the invention, each of the substantially identical wing members is elliptically shaped, although other shapes are possible and may be used in alternate embodiments of the invention. In another non-limiting embodiment the ends 80, 82 are not respectively received by the members 110, 112 but terminate within respective members 18, 20.

The portable transportation assembly 10 further includes a hydraulic cylinder assembly 140 which is removably coupled to the member 26 and which is operatively disposed along the longitudinal axis of symmetry 14. The portable transportation assembly 10 further includes a pivot arm assembly 150 which is pivotally coupled to the hydraulic cylinder assembly 140 by use of pivot member 151 and which, when moved in the direction of arrow 152, causes the assembly 140 to move in the direction of arrow 154 and when moved in the direction of arrow 156 causes the assembly 140 to move in the direction of arrow 158. Further, the hydraulic cylinder assembly 140 is coupled to a motion conversion member 190 and the member 190 is coupled to the axle 90. In one non-limiting embodiment of the invention, the motion conversion member 190 is generally "C" shaped or curved and has an end portion 95 which is coupled to the hydraulic cylinder assembly 140 and a curved reception portion 197, which is coupled to the axle 90. As shown, when the pivot arm 150 is moved in the direction of arrow 156, the hydraulic cylinder assembly 140 moves in the direction of arrow 154 which causes the motion conversion member 190 to rotate the axle 90 in a manner in which the wheels 40, 42 are placed in a raised storage position (shown in phantom in FIG. 3), and when the pivot arm 150 is moved in the direction of arrow 152, the axle 90 is made to rotate, by the conversion member 190, in a manner in which the wheels 40, 42 are placed in a lowered operative position as shown in FIG. 3. In this manner, the assembly 10 may be easily stored when not in use and easily and efficiently made ready for use and the motion of the hydraulic cylinder assembly 140 is transferred to the axle 90.

When it is desired to use the portable transportation assembly 10, a portable bathroom assembly, such as assembly 200, is placed upon the ledges 50 of the members 18, 20 (i.e., the ledges 50 extend into the portions 74, 76). The wheels 40, 42 are lowered in the afore-described manner and the pivot arm 150 is coupled to relatively small motor assembly (i.e., a golf cart). In this manner, the assembly 200 may be easily and efficiently transported to a desired location by a relatively small motorized vehicle.

Figure 4:
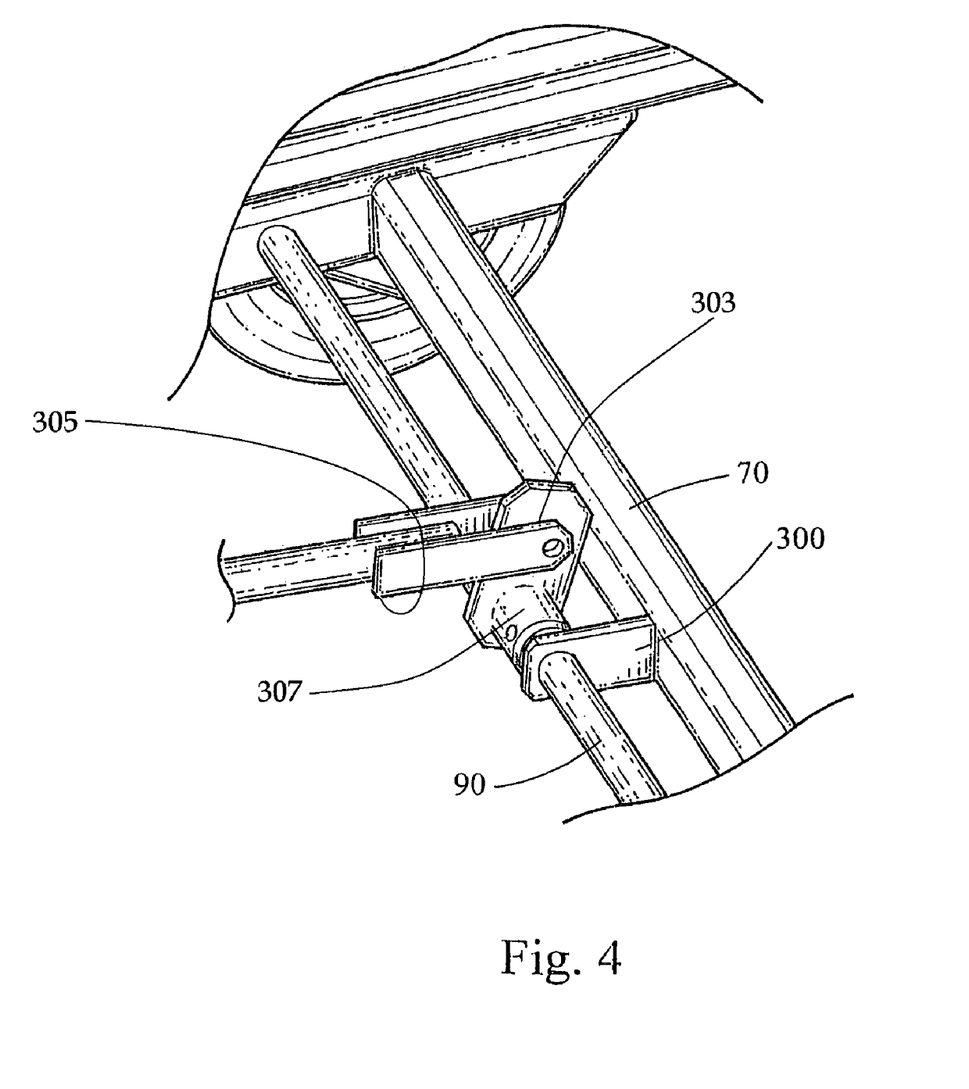
FIG. 4 is a partial cut-away and exploded view of a portion of a portion of the portable transportation assembly which is shown in FIG. 3, according to an alternate embodiment of the invention.
Figure 5:
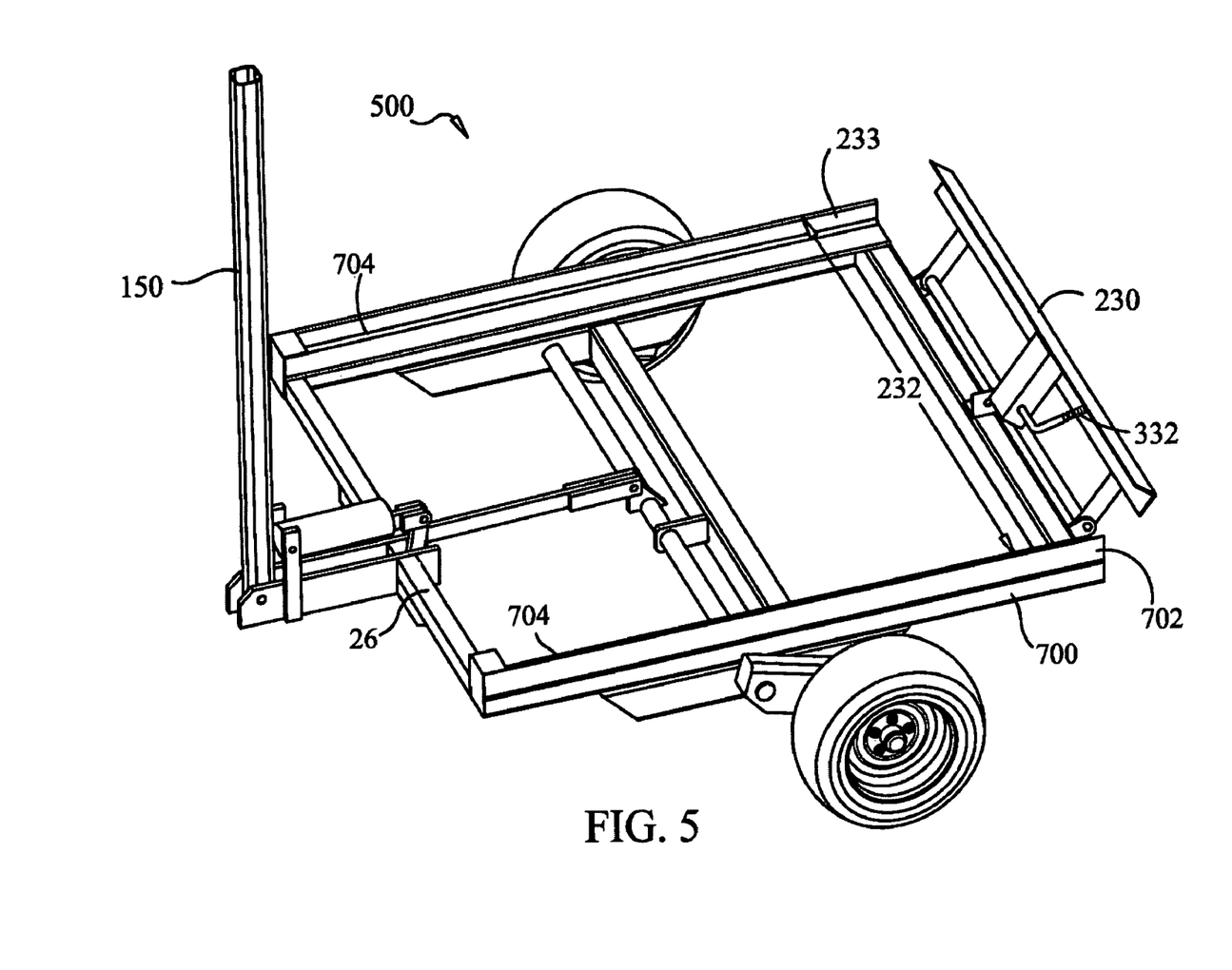
FIG. 5 is a perspective view of a portable transport action assembly which is made in accordance with the teachings of another alternate embodiment of the invention.
Figure 6:
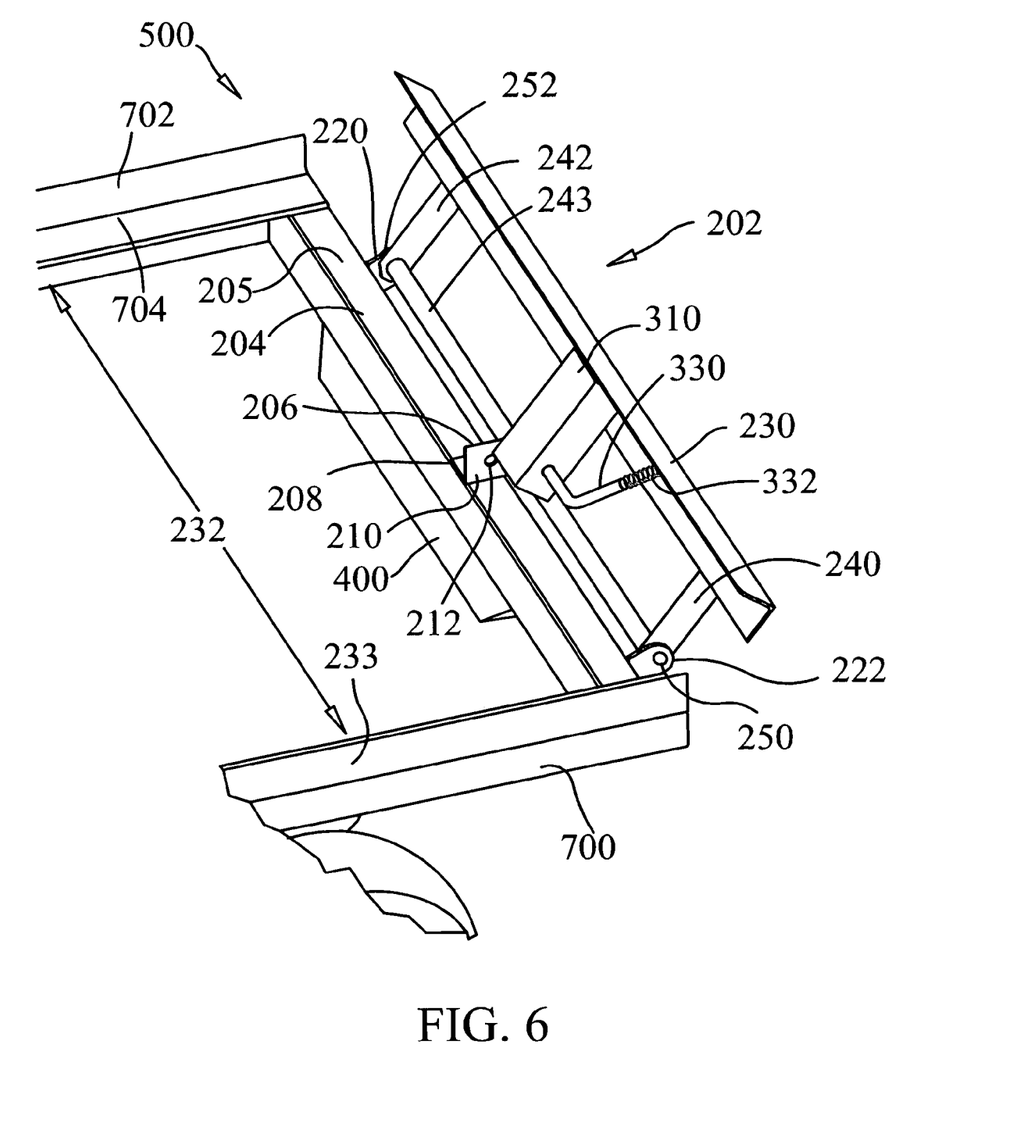
FIG. 6 is a partial exploded view of the assembly shown in FIG. 5.
Figure 7:
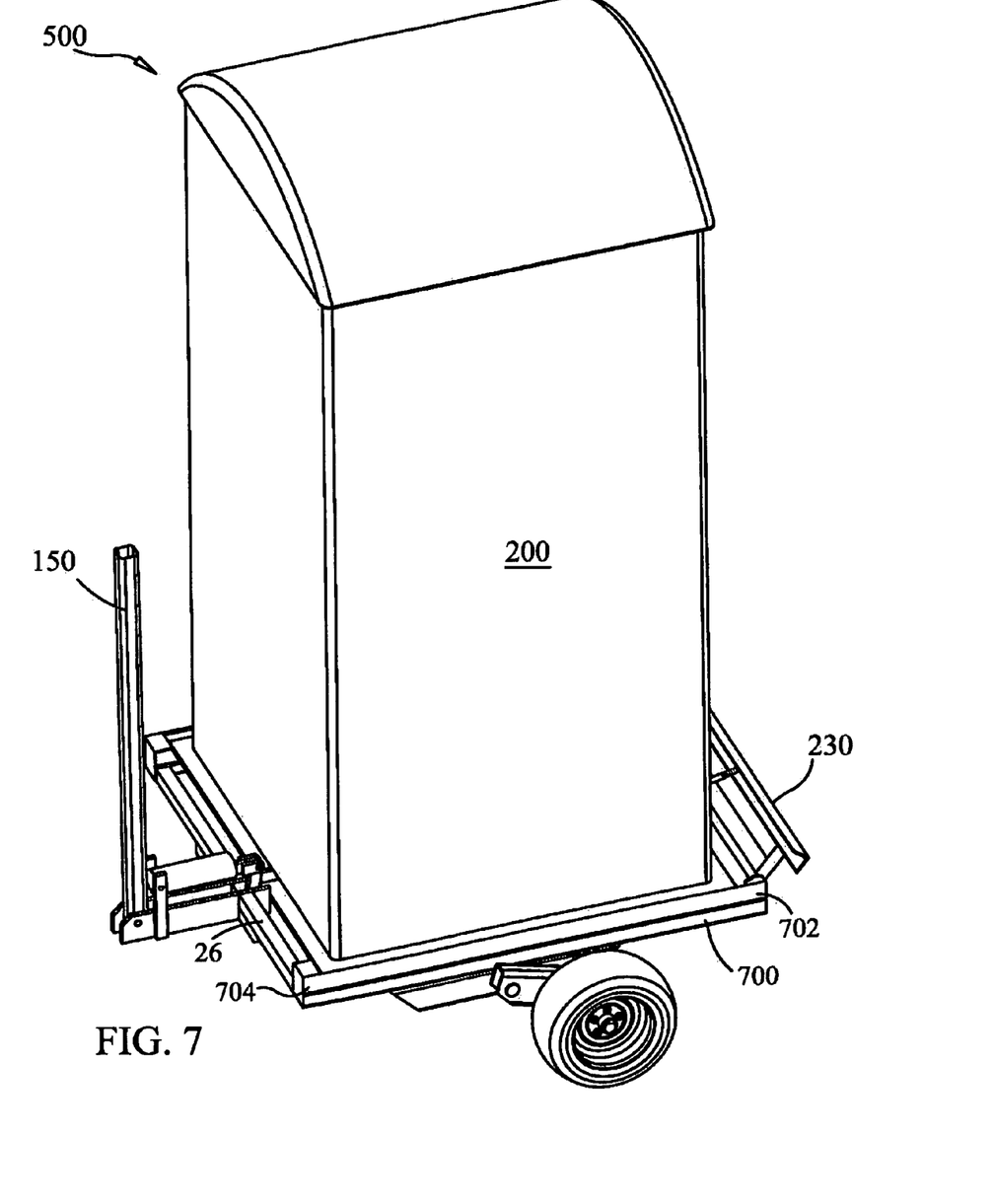
FIG. 7 is a view which is similar to that of FIG. 5 but illustrating the transport of a typical portable bathroom.
Figure 8:
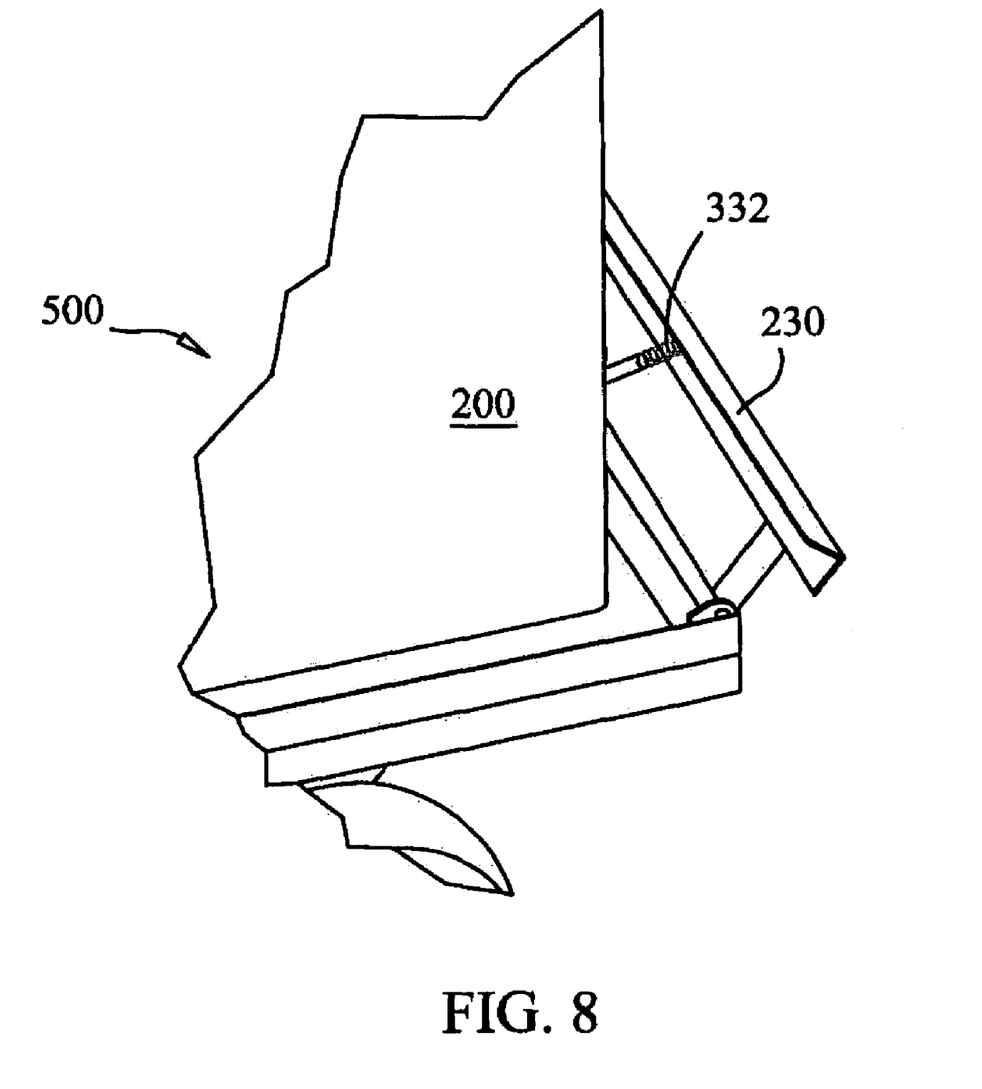
FIG. 8 is a partial exploded view of FIG. 7.

It is to be understood that the present invention is not limited to the exact construction or method illustrated and described above, but that various changes and modifications may be made without departing from the spirit and the scope of the inventions as are described more fully in the following claims. It should be apparent that the assembly 10 may be used to transport any desired apparatus or assembly, other than the portable bathroom assembly 200 and that the pivot arm 150 in combination with the hydraulic cylinder assembly 140 and the member 190 may be considered to be a "tug assembly". Further, it should be appreciated that multiple items may be simultaneously carried by the assembly 10 by use of the two substantially similar reception and containment portions 74, 76. Further, in another non-limiting embodiment (as best shown in FIG. 4), the assembly 10 further includes a bracket portion 300 which movably receives the axle 90 and which couples the axle 90 to the axle 70, further structurally strengthening the assembly 10. This non-limiting embodiment further connects the hydraulic cylinder assembly 140 to the axle 90 by use of a plate 303 instead of by use of member 190 (e.g., plate 303 is coupled to portion 305 of the hydraulic cylinder assembly 140). In the most preferred embodiment of the invention, the plate 303 has an octagonal shape (e.g., eight-sided), although other shapes may be utilized and, in one non-limiting embodiment, the plate 303 integrally includes a flared portion 307 which receives axle 90. The portion 307 reduces the likelihood of structural damage to the plate 303 during use (e.g., during energy transfer from cylinder assembly 140 to the axle 90), and allows axle 90 to pass through plate 303.

Referring now to FIGS. 5-8, there is shown a portable transportation assembly 500 which is made in accordance with the teachings of an alternate embodiment of the invention. Particularly, the portable transportation assembly 500, of this second alternate embodiment of the invention, may be substantially similar to the previously described portable transportation assembly 10, except for the features which are set forth below in greater detail. It should be noted that the reference numbers are consistently used throughout this description and, in this manner, a reference number which may be used in several of the drawings refers to the same part, assembly, or other tangible item, unless otherwise noted.

That is, end member 22 may be selectively replaced by a back bumper assembly 202. Particularly, the back bumper assembly 202 includes a first member 204 having a generally square cross sectional area and being selectively coupled to the members 18, 20 while concomitantly forming a substantial right angle with each of the members 18, 20. Alternatively, the member 204 may be substantially "L" shaped and/or may be hollow and the member 204 may be coupled to members 18, 20 by welding or any other conventional technique. In an alternate embodiment, member 204 (may integrally comprise a portion of the frame 12. Further, as shown best in FIGS. 5, 6, and 7, the members 18 and 20 may be modified from that which has been previously described. Particularly, member 18 may be replaced by a first member 700 having a substantially square cross-sectional area and being linearly coextensive to the containment portion 16 and a substantially "L-shaped" member 702 which is deployed on the top of member 700 (e.g., away from the wheels 40, 42) and is linearly coextensive to member 700 while forming a reception slot 704. Member 700 may be integrally formed with member 702. Member 20 may be replaced by a similar arrangement (e.g., the combination of members 700, 702), and the slots 704 communicate with the storage reception portion 16. Members 702 may be welded onto members 700 and members 700 may be respectively welded onto member 26.

The back bumper assembly 202 further includes an "L-shaped" bracket member 206 having a first planar portion 208 which is coupled to and which is positioned upon the flat top surface 205 of member 204, and a second planar portion 210 which is orthogonally positioned with respect to the first planar portion 208 (e.g., forms a right angle with portion 208) and which, in one non-limiting embodiment, is integrally formed with portion 208. Further, portion 210 includes an aperture 212.

Further, a pair of substantially identical hinges 220, 222 are formed with the member 204 and outwardly protrudes away from the member 150. Additionally, the assembly 202 includes an "L" shaped member 230 which, when operatively assembled as part of the assembly 202, is linearly coextensive to the length 232 between the respective side portions 233 of each of the members 18, 20 or their replacements (e.g., respective replacement members 700, 702). The member 230 includes a pair of substantially identical and outwardly protruding hinges 240, 242 and the hinges 240, 242 are respectively and selectively coupled to and receive axle 243 which traverses and extends through the hinges 240, 242.

Further, hinge 222 is coupled to hinge 240 by the axle 243 which traverses these coupled hinges 222, 240 and the hinge 220 is coupled to the hinge 242 by the axle 243 which also traverses these coupled hinges 220, 242. A cap or nut 250 and a cap or nut 252 may be placed upon each protruding end of the axle 243 in order to cause the axle 243 to remain operatively coupled to the pairs of hinges 222, 240; and 220, 242. In the foregoing manner, it should be appreciated that the member 230 is articulatively coupled to the member 204 and may be selectively moved from a first closed position in which the member 230 contacts and overlays the side portions 233 of members 18, 20 (or respective members 702) and in which the member 230 cooperates with members 18,20 and 26 to close the containment portions 74, 76; to an open position in which the carried assembly 200 (e.g., a portable toilet) may be placed within or upon the portions 74, 76 through the space lying between the members 18, 20, or member 704 (e.g., the member 230 is fully articulated away from the member 204.

In a non-limiting embodiment of the invention, a pin member 330 is attached to the member 230 by a biasing spring member 332. The member 330 passes through a bracket 310, which is coupled to the member 230, and the spring 332 biases the member 330 away from the bracket member 310.

In operation, when the member 230 is placed in a closed position, the member 330 may be selectively placed through the aperture 212, thereby locking the member 230 in a closed position. When it is desired to open the portions 74, 76, the member 330 is forced against the biasing spring 332 and out of the aperture 212, thereby allowing the member 230 to easily articulate away from the members 18, 20, to an open position. In yet another non-limiting embodiment of the invention, an angled support member 400 is attached to the underside of member 204 to provide strength and rigidity. The hydraulic cylinder assembly 140 may, in another non-limiting embodiment, be not used and axle 90 may be selectively rotated by substantially any desired member which is coupled to member 190 (e.g., a member which is shaped much like member 150 but which is coupled to end portion 95.

What is claimed is:

1. A portable transportation assembly comprising an assembly having a frame and wherein said frame having a certain width; a pair wheels; a pair of dissimilar axles which are attached to said frame in a spatially offset manner; a pair of members which are each connected to said pair of dissimilar axles and which are further connected to said pair of wheels; and an assembly which is coupled to one of said pair of dissimilar axles and which selectively rotates said one of said pair of dissimilar axles from a first position to a second position, effective to move said pair of wheels from a first operative and low position to a second raised and storage position, wherein said frame includes a selectively movable back bumper assembly and wherein said selectively movable back bumper assembly includes an L-shaped bracket member having a first planar portion coupled to and positioned upon a flat surface of said frame and wherein said first planar portion is parallel to said flat surface, and a second planar portion which is orthogonally positioned to said first planar portion and wherein said second planar portion having an aperture; a pair of substantially identical first and second hinges which are coupled to said frame and which protrude outwardly from said frame; an L-shaped back member which is linearly coextensive to said certain width and having a pair of substantially identical and orthogonally protruding third and fourth hinges; an axle which is coupled to said pair of substantially identical third and fourth hinges, and wherein said first hinge is coupled to said third hinge by said axle and wherein said axle traverses and extends through said first and said third hinges, and wherein said second hinge is coupled to said fourth hinge by said axle and wherein said axle traverses and extends through said second and said fourth hinges, thereby allowing said back member to be movable from a first open position to a second closed position; a pin member which is coupled to said back member by a spring member and which is adapted to be received by said aperture.

2. The portable transportation assembly of claim 1 wherein a first of said pair of dissimilar axles is thinner than a second of said pair of dissimilar axles.

3. The portable transportation assembly of claim 2 wherein said assembly comprises a pivot arm member; a hydraulic cylinder, which is coupled to said pivot arm member; and a motion conversion member which is coupled to said hydraulic cylinder assembly and to said one of said pair of dissimilar axles.

4. The portable transportation assembly of claim 3 wherein said first of said pair of dissimilar axles cooperates with said frame to form a pair of reception and containment portions.

5. The portable transportation assembly of claim 4 wherein each of said pair of reception and containment portions are substantially identical.

* * * * *